US011665025B2

(12) United States Patent
Cao et al.

(10) Patent No.: US 11,665,025 B2
(45) Date of Patent: *May 30, 2023

(54) INFORMATION TRANSMISSION METHOD AND SYSTEM, AND CONVERGENCE GATEWAY

(71) Applicant: Huawei Technologies Co., Ltd., Shenzhen (CN)

(72) Inventors: Yaobing Cao, Shenzhen (CN); Yu Zhong, Shenzhen (CN); Kun Liu, Shenzhen (CN); Zhengquan Huang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 150 days.

This patent is subject to a terminal disclaimer.

(21) Appl. No.: 17/189,986

(22) Filed: Mar. 2, 2021

(65) Prior Publication Data

US 2021/0258191 A1    Aug. 19, 2021

Related U.S. Application Data

(63) Continuation of application No. 16/253,652, filed on Jan. 22, 2019, now Pat. No. 10,958,482, which is a continuation of application No. PCT/CN2017/072901, filed on Feb. 4, 2017.

(30) Foreign Application Priority Data

Jul. 22, 2016    (CN) .......................... 201610587283.3

(51) Int. Cl.
*H04L 12/66* (2006.01)
*H04W 88/16* (2009.01)
(Continued)

(52) U.S. Cl.
CPC .......... *H04L 12/66* (2013.01); *H04L 63/0853* (2013.01); *H04L 63/0884* (2013.01);
(Continued)

(58) Field of Classification Search
CPC . H04L 12/66; H04L 63/0853; H04L 63/0884; H04L 65/1016; H04L 65/1045;
(Continued)

(56) References Cited

U.S. PATENT DOCUMENTS

2010/0008299 A1    1/2010    Shin et al.
2012/0020252 A1    1/2012    Bouthemy
(Continued)

FOREIGN PATENT DOCUMENTS

CN    101030964 A    9/2007
CN    101605154 A    12/2009
(Continued)

*Primary Examiner* — Peter P Chau
(74) *Attorney, Agent, or Firm* — Conley Rose, P.C.

(57) ABSTRACT

An information transmission method and system, and a convergence gateway, where the method includes receiving, by the convergence gateway, a service request from first user equipment, where the service request includes identity information of the first user equipment and service information of the first user equipment, obtaining, by the convergence gateway, first user permission information of the first user equipment in a first network according to the identity information of the first user equipment, and determining, by the convergence gateway based on the first user permission information, a forwarding manner for forwarding the service information to second user equipment. A convergence service for a private network and a public network is implemented using the convergence gateway such that indoor communication signal quality can be improved, and network construction costs can be reduced.

20 Claims, 8 Drawing Sheets

(51) Int. Cl.
*H04W 12/06* (2021.01)
*H04L 65/1073* (2022.01)
*H04L 65/1016* (2022.01)
*H04W 12/08* (2021.01)
*H04L 9/40* (2022.01)
*H04L 65/1045* (2022.01)
*H04L 65/1104* (2022.01)

(52) U.S. Cl.
CPC ...... *H04L 65/1016* (2013.01); *H04L 65/1045* (2022.05); *H04L 65/1073* (2013.01); *H04L 65/1104* (2022.05); *H04W 12/06* (2013.01); *H04W 12/08* (2013.01); *H04W 88/16* (2013.01)

(58) Field of Classification Search
CPC ............ H04L 65/1073; H04L 65/1104; H04W 12/06; H04W 12/08; H04W 88/16
See application file for complete search history.

(56) References Cited

U.S. PATENT DOCUMENTS

| | | |
|---|---|---|
| 2013/0142059 A1 | 6/2013 | Di Girolamo et al. |
| 2015/0063346 A1 | 3/2015 | Eswara et al. |
| 2016/0316416 A1 | 10/2016 | Raval et al. |
| 2017/0026422 A1* | 1/2017 | Klein ................. H04L 45/64 |
| 2018/0084421 A1* | 3/2018 | Yang .................. H04W 4/08 |

FOREIGN PATENT DOCUMENTS

| | | |
|---|---|---|
| CN | 101800760 A | 8/2010 |
| CN | 102202299 A | 9/2011 |
| CN | 103052064 A | 4/2013 |
| CN | 103297338 A | 9/2013 |
| CN | 103747154 A | 4/2014 |
| CN | 102884861 B | 2/2016 |
| EP | 2574096 A1 | 3/2013 |
| WO | 2014130446 A1 | 8/2014 |

* cited by examiner

INFORMATION TRANSMISSION METHOD AND SYSTEM, AND CONVERGENCE GATEWAY

CROSS-REFERENCE TO RELATED APPLICATIONS

This application is a continuation of U.S. patent application Ser. No. 16/253,652, filed on Jan. 22, 2019, which is a continuation of International Application No. PCT/CN2017/072901 filed on Feb. 4, 2017, which claims priority to Chinese Patent Application No. 201610587283.3 filed on Jul. 22, 2016. All of the aforementioned patent applications are hereby incorporated by reference in their entireties.

TECHNICAL FIELD

This application relates to the field of communications technologies, and in particular, to an information transmission method and system, and a convergence gateway.

BACKGROUND

With continuous development of terminal technologies and Internet technologies, a mobile terminal, such as a mobile phone, can implement more functions. For example, a user can make a call or surf on the Internet using the mobile phone. This brings great convenience for the user. Currently, a private network is usually deployed in some particular areas, such as an office area of an enterprise. An operator may lease an enterprise site and deploy a small cell to implement indoor wireless signal coverage. The site is an address of a base station, for example, an equipment room used for installing a base station device.

In actual communication, the private network is isolated from the wireless network provided by the operator. When an enterprise employee performs voice or data communication using a terminal, voice or data needs to be backhauled to a core network of each operator, and then pass through the Internet, a public switched telephone network (PSTN), and the private network inside the enterprise in order to implement communication inside the enterprise. That is, the private network cannot provide a convergence service for the private network and the operator wireless network. Consequently, an enterprise user cannot directly access the enterprise private network using the operator wireless network, and public resources of the operator wireless network cannot be used to implement a value-added service inside the enterprise. In addition, for indoor coverage of the operator wireless network, there is usually a problem that an indoor signal is weak because a site is difficult to obtain. Moreover, a plurality of operator wireless networks need to be repeatedly constructed indoors, and consequently construction costs are relatively high.

SUMMARY

This application provides an information transmission method and system, and a convergence gateway. A convergence service for a private network and a public network can be provided in order to improve indoor communication signal quality and reduce network construction costs.

According to a first aspect, this application provides an information transmission method, applied to a first network, where a convergence gateway is deployed in the first network, the first network is connected to a second network using the convergence gateway, and the method includes receiving, by the convergence gateway, a service request sent by first user equipment, where the service request includes identity information of the first user equipment and service information of the first user equipment, obtaining first user permission information of the first user equipment in the first network according to the identity information of the first user equipment, and determining, based on the first user permission information, a forwarding manner for forwarding the service information to second user equipment, where the forwarding manner includes any one of the following manners, directly forwarding the service information to the second user equipment using the convergence gateway, or forwarding the service information to the second network using the convergence gateway, and forwarding the service information to the second user equipment using the second network.

The permission information of the user equipment in the first network is obtained to determine the forwarding manner of the service information for the user equipment such that the user equipment can implement, based on the convergence gateway, communication between user equipment in a private network and another user equipment. In this way, a convergence service for the private network and a public network can be provided, communication efficiency can be improved, indoor communication signal quality can be improved, and communication costs can be reduced.

In some possible implementations, before receiving the service request sent by the first user equipment, the convergence gateway may further receive an attach request that is sent by the first user equipment and that is used to request to access the first network, obtain, in response to the attach request, a proxy server address configured for the convergence gateway, and send the proxy server address to the first user equipment such that the first user equipment accesses the first network based on the proxy server address and communicates with the second user equipment using the convergence gateway.

In some possible implementations, a specific manner for obtaining a proxy server address configured for the convergence gateway may be forwarding, by the convergence gateway, the attach request to the second network, and receiving the proxy server address returned by the second network for the attach request, or obtaining, by the convergence gateway using a preset signaling interface, the proxy server address configured for the convergence gateway, or obtaining, by the convergence gateway from subscription information of the first user equipment, the proxy server address configured for the convergence gateway.

In some possible implementations, the proxy server address may be a proxy-call session control function (P-CSCF) address.

In some possible implementations, a specific manner for determining, based on the first user permission information, a forwarding manner for forwarding the service information to second user equipment may be obtaining, by the convergence gateway, second user permission information of the second user equipment in the first network, sending, by the convergence gateway, the service information to the second user equipment if the first user permission information indicates that the first user equipment is an authorized user in the first network and the second user permission information indicates that the second user equipment is also an authorized user in the first network, and forwarding, by the convergence gateway, the service information to the second network, and sending the service information to the second user equipment using the second network if the second user permission information indicates that the second user equipment is a user in the second network.

Further, when the first user equipment and the second user equipment are both users in the first network and at least one of the first user equipment and the second user equipment is a common user, the forwarding manner may be determined according to a charging policy negotiated in advance by the first network and the second network. In this way, a public permission can be reserved when voice, data, and a number are kept unchanged, and a plurality of value-added services and service interfaces can be provided in order to perform permission management for different access user types.

In some possible implementations, after the convergence gateway sends the proxy server address to the first user equipment, the convergence gateway may further send a network identifier of the first network to the first user equipment such that the first user equipment displays the network identifier.

The network identifier may be used to identify convergence deployment for the first network and the second network, for example, may include identification information such as a service provider name or an enterprise name in order to identify the convergence deployment. Further, the network identifier may be preconfigured.

In some possible implementations, the network identifier of the first network may be carried in an over-the-air (OTA) message delivered by the convergence gateway, and the OTA message may be delivered based on a network identity and time zone (NITZ) mechanism. In this way, customization of the network identifier can be implemented, and user experience is improved.

According to a second aspect, this application further provides a convergence gateway, where the convergence gateway is deployed in a first network, the first network is connected to a second network using the convergence gateway, the convergence gateway includes a receiving module, an information obtaining module, and a forwarding determining module, and the convergence gateway implements some or all steps of the information transmission method according to the first aspect using the modules.

According to a third aspect, this application further provides a computer storage medium, where the computer storage medium stores a program, and when the program is executed, some or all steps of the information transmission method according to the first aspect are performed.

According to a fourth aspect, this application further provides a convergence gateway, including a communications interface, a memory, and a processor, where the processor is connected to the communications interface and the memory respectively, and the processor is configured to perform some or all steps of the information transmission method according to the first aspect.

According to a fifth aspect, this application further provides an information transmission system, including a first network and a convergence gateway, where the convergence gateway is configured to receive a service request sent by first user equipment in the first network, where the service request includes identity information of the first user equipment and service information of the first user equipment, obtain first user permission information of the first user equipment in the first network according to the identity information of the first user equipment, and determine, based on the first user permission information, a forwarding manner for forwarding the service request to second user equipment, and the forwarding manner includes any one of the following manners directly forwarding the service information to the second user equipment using the convergence gateway, or forwarding the service information to a second network using the convergence gateway, and forwarding the service information to the second user equipment using the second network, where the first network is connected to the second network using the convergence gateway.

In some possible implementations, the first network may further include a first switch, a second switch, and a small cell. The first switch is configured to receive a service request sent by user equipment (which is not user equipment in the small cell) in the first network. The second switch is configured to receive a service request sent by the small cell, and the service request may be a service request sent by user equipment in the small cell. The first switch and the second switch forward the service requests to the convergence gateway. In this way, communication between the user equipment in the first network and another user equipment can be implemented based on the convergence gateway such that indoor communication signal quality is improved, and communication costs are reduced.

In the technical solutions provided in this application, the convergence gateway may obtain the user permission information of the user equipment in the first network when receiving the service request sent by the user equipment in order to determine, based on the user permission information, to directly forward the service information corresponding to the service request to another user equipment using the convergence gateway, or forward the service information to the second network using the convergence gateway, and forward the service information to the second user equipment using the second network such that the user equipment implements, based on the convergence gateway, communication between the user equipment in the private network and the other user equipment. In this way, a convergence service for the private network and the public network can be provided, communication efficiency can be improved, indoor communication signal quality can be improved, and network construction costs can be reduced.

DESCRIPTION OF EMBODIMENTS

The following describes the technical solutions in this application with reference to the accompanying drawings in the embodiments of the present disclosure. The described embodiments are merely some rather than all of the embodiments of this application. All other embodiments obtained by a person of ordinary skill in the art based on the embodiments of this application without creative efforts shall fall within the protection scope of the present disclosure.

"First", "second", and the like in this application are used to distinguish different objects, but are not used to indicate a specific sequence. In addition, the term "include" or any other variant thereof is intended to cover a non-exclusive inclusion. For example, a process, a method, a system, a product, or a device that includes a series of steps or modules is not limited to the listed steps or modules, but optionally further includes an unlisted step or module, or optionally further includes another inherent step or module of the process, the method, the product, or the device.

In this application, a first network is a private network, and a second network is a public network. The private network may be configured in an enterprise, a school, a hospital, or the like, and the public network may include wireless networks of various standards. For example, the wireless network includes Code Division Multiple Access (CDMA), Wideband CDMA (WCDMA), Time Division-Synchronous CDMA (TD-SCDMA), a Universal Mobile Telecommunication System (UMTS), or a Long Term Evolution (LTE) network. With continuous development of communications technologies, technical solutions in this application may be further used in a future network, such as a fifth generation mobile communication technology (5G) network. This is not limited in the embodiments of the present disclosure.

In this application, user equipment (also referred to as UE) may also be referred to as a terminal, a mobile station (MS), a mobile terminal, or the like. The user equipment may include a smartphone, an Internet Protocol (IP) phone, a personal computer, or the like. Further, a small cell in this application is a base station in the public network, an access point (AP) in a wireless local area network (WLAN), or the like. The base station may be a microcell, a picocell, or the like. The microcell or picocell is generally classified according to power. For example, power of the microcell is usually approximately 1 watt (w) to 5 w, and power of the picocell is usually 50 milliwatt (mw) to 100 mw. For example, the base station may be an evolved NodeB in the LTE, such as an evolutional Node B (eNB or an e-NodeB), or a NodeB in a 3rd generation mobile telecommunications (3G) network, or a base station in the future network. This is not limited in the embodiments of the present disclosure.

Figure 1:
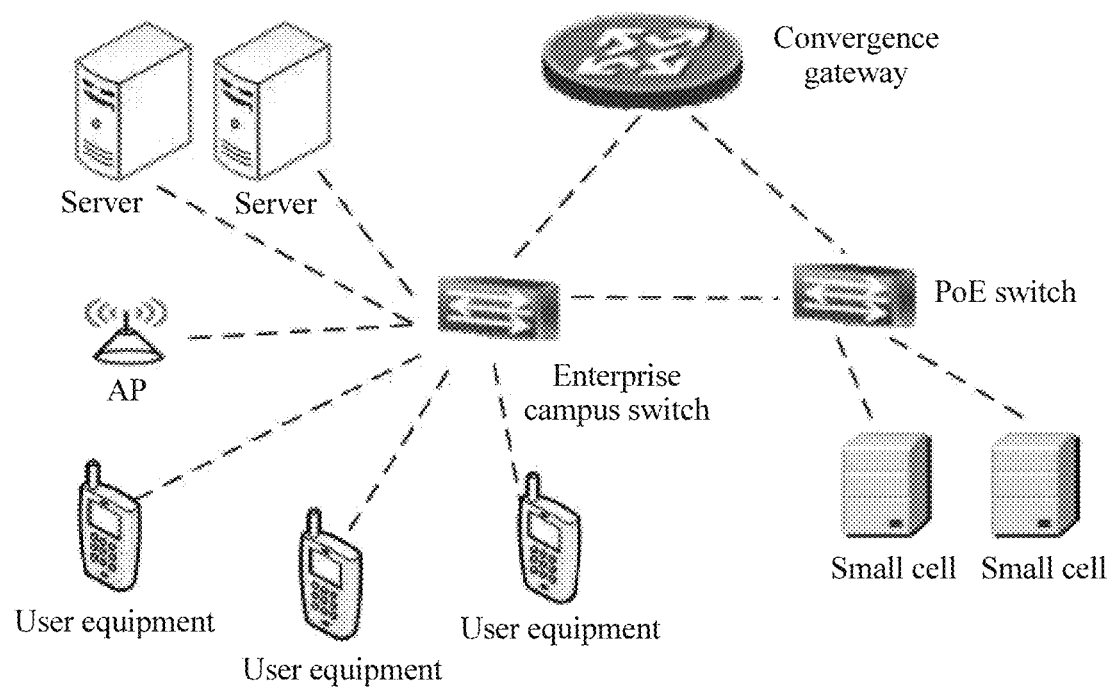
FIG. 1 is a schematic diagram of a convergence gateway deployment scenario according to an embodiment of the present disclosure.

Referring to FIG. 1, FIG. 1 is a schematic diagram of a convergence gateway deployment scenario according to an embodiment of the present disclosure. Further, that a private network is an enterprise network and a public network is an operator wireless network is used as an example. As shown in FIG. 1, a convergence gateway is deployed inside an enterprise such that user equipment in the enterprise private network can perform voice or data communication with another user equipment using the convergence gateway. That is, all service information (including a message that is of user equipment in an enterprise campus and that is received by an enterprise campus switch and a message that is of a small cell and that is received by a Power Over Ethernet (PoE) switch) in the enterprise private network needs to pass through the convergence gateway in order to implement a convergence service for the enterprise private network and the operator wireless network. Further, a routing module, a small cell control module, an IP multimedia subsystem (IMS) module, and an evolved packet core (EPC) module are integrated into the convergence gateway. The other user equipment includes user equipment in the private network or user equipment outside the private network (that is, in the public network).

Figure 2:
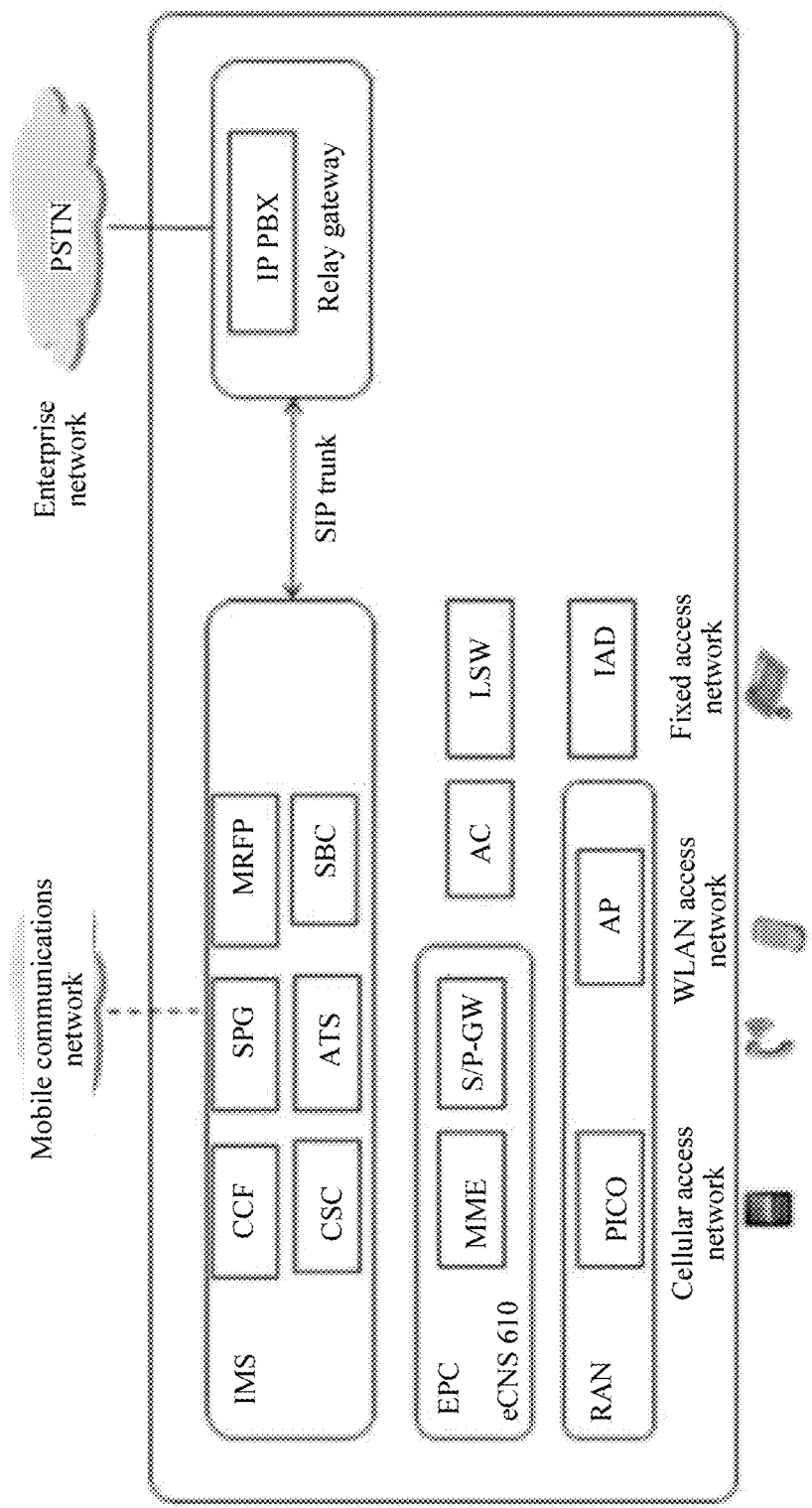
FIG. 2 is a schematic structural diagram of a private network according to an embodiment of the present disclosure.

Referring to FIG. 2, FIG. 2 is a schematic structural diagram of a private network according to an embodiment of the present disclosure. That the private network is an enterprise network and a public network is an operator wireless network is still used as an example. As shown in FIG. 2, a routing module, an indoor small cell control module, an IMS module, and an EPC module are combined into one device to obtain a convergence gateway in the technical solutions in this application. The small cell control module is configured to implement a function of a radio access network (RAN) in FIG. 2. The IMS module carries a function such as a call control function (CCF), a call session controller (CSC) function, a service provisioning gateway (SPG) function, a multimedia resource function processor MRFP) function, a session border controller (SBC) function, or an advanced telephony server (ATS) function. The EPC module carries a function of a mobility management entity (MME), System Architecture Evolution (SAE), or a gateway (GW). The routing module is mainly configured to receive and send a message of user equipment in the enterprise private network. The small cell control module is mainly configured to receive and send a message of a small cell deployed by an operator. The IMS module is mainly configured to perform authentication, registration, or the like on the user equipment. The EPC module is mainly configured to send a proxy server address, an enterprise customized identifier, or the like to the user equipment. In this way, based on the convergence gateway, an enterprise user can directly access the enterprise network using 3G or LTE or another wireless network, and an enterprise customized identifier, policy, service, and the like are provided when an original service (that is, keeping a public permission and a number of the user equipment unchanged) of a mobile operator is carried.

Figure 3A:
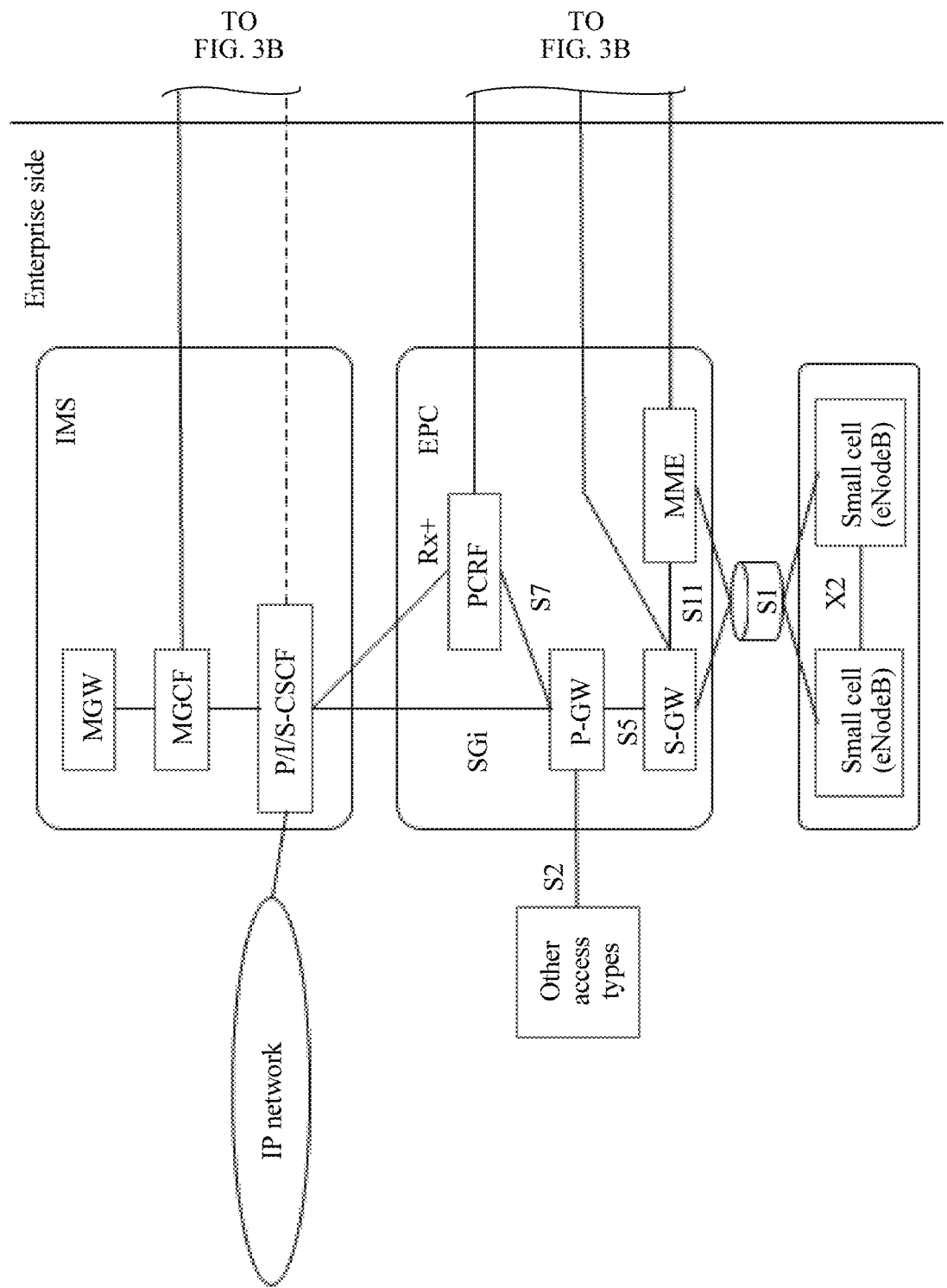
FIG. 3A and FIG. 3B are a schematic logical diagram of establishing a connection between a private network and a public network according to an embodiment of the present disclosure.
Figure 3B:
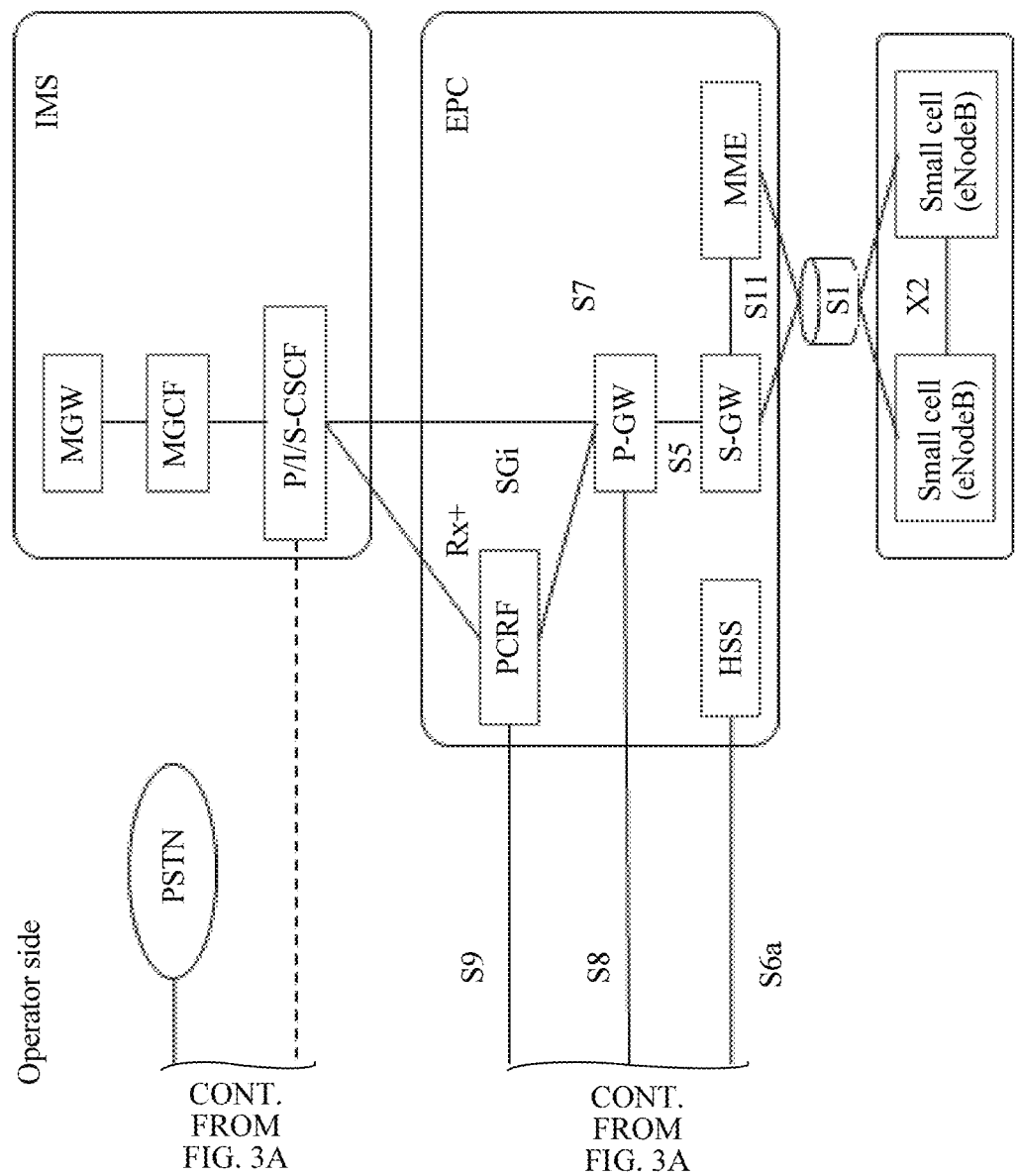

Further, referring to FIG. 3A and FIG. 3B, FIG. 3A and FIG. 3B are a schematic logical diagram of establishing a connection between a private network and a public network according to an embodiment of the present disclosure. As shown in FIG. 3A and FIG. 3B, that the private network is an enterprise network and the public network is an operator wireless network is still used as an example. An enterprise side may use a roaming interface to connect to an operator core network. The roaming interface includes an S6a interface, an S8 interface, an S9 interface, or the like, and the S6a interface, the S8 interface, and the S9 interface are interfaces in an LTE roaming architecture defined in the $3^{rd}$ Generation Partnership Project (3GPP). In a roaming scenario, the MME in the EPC module is connected to a home subscriber server (HSS) on an operator side using the S6a interface, a serving gateway (S-GW) in the EPC module is connected to a public data network (PDN) gateway (P-GW) on the operator side using the S8 interface, and a policy and charging rules function (PCRF) in the EPC module is connected to a PCRF on the operator side using the S9 interface. In this way, the enterprise private network can be functionally used as a cell of the operator network, that is, complementary network coverage for the operator network is implemented. Optionally, the private network may be simultaneously connected to wireless networks of a plurality of operators.

This application discloses an information transmission method and system, and a convergence gateway. A convergence service for a private network and a public network can be implemented by configuring a convergence gateway, indoor communication signal quality can be improved, and network construction costs can be reduced.

Figure 4:
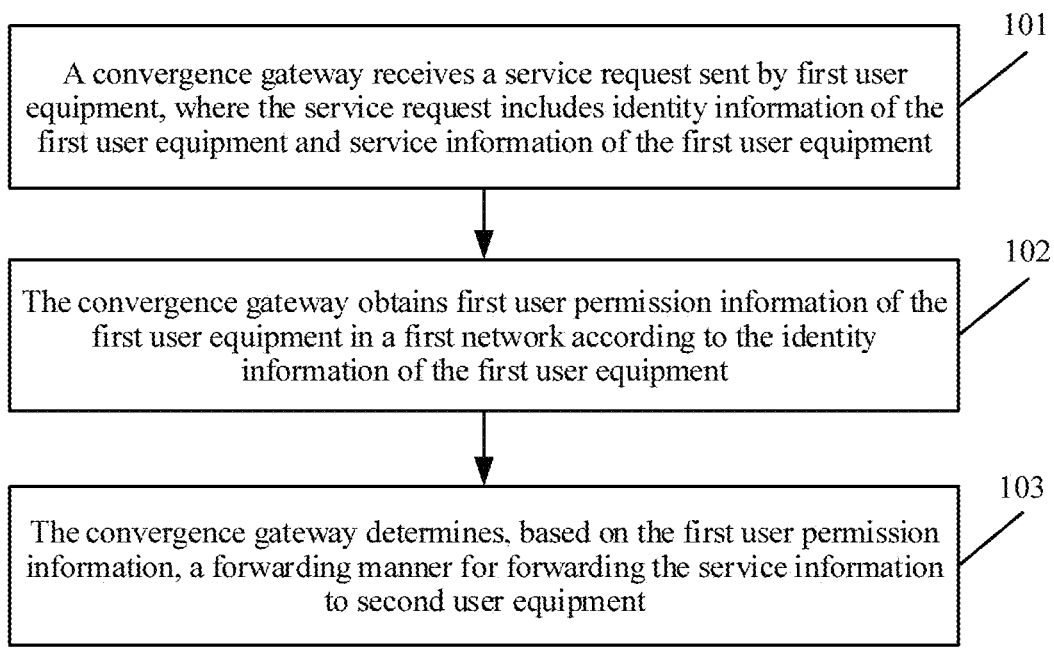
FIG. 4 is a schematic flowchart of an information transmission method according to an embodiment of the present disclosure.

Referring to FIG. 4, FIG. 4 is a schematic flowchart of an information transmission method according to an embodiment of the present disclosure. Further, the method of the present disclosure may be applied to a first network, that is, the foregoing private network, a convergence gateway is deployed in the first network, and the first network is connected to a second network using the convergence gateway. As shown in FIG. 4, the information transmission method in this embodiment of the present disclosure includes the following steps.

Step 101. The convergence gateway receives a service request sent by first user equipment, where the service request includes identity information of the first user equipment and service information of the first user equipment.

The first user equipment may be user equipment in a coverage area of the first network, that is, the private network. Further, the service request may be a call request, a data request, or the like. Correspondingly, the service information may include voice information, data information, or the like.

Step 102. The convergence gateway obtains first user permission information of the first user equipment in the first network according to the identity information of the first user equipment.

The convergence gateway may determine a permission of the first user equipment according to the identity information of the first user equipment, for example, determines that the first user equipment is an enterprise employee in the private network such as an enterprise network, or a common user (visitor) in the enterprise network.

Further, before receiving the service request sent by the first user equipment, the convergence gateway may further receive an attach request that is sent by the first user equipment and that is used to request to access the first network, the convergence gateway obtains, in response to the attach request, a proxy server address configured for the convergence gateway, and the convergence gateway sends the proxy server address to the first user equipment such that the first user equipment accesses the first network based on the proxy server address and communicates with the second user equipment using the convergence gateway. The communication includes voice communication, data communication, or the like. The proxy server address may be a P-CSCF address.

Optionally, a specific manner for obtaining the proxy server address configured for the convergence gateway may be as follows. The convergence gateway forwards the attach request to the second network, and receives the proxy server address returned by the second network for the attach request, the convergence gateway obtains, using a preset signaling interface, the proxy server address configured for the convergence gateway, or the convergence gateway obtains, from subscription information of the first user equipment, the proxy server address configured for the convergence gateway.

Further, when entering the coverage area of the private network, such as an area of an enterprise network, the user equipment may request a proxy server address of the enterprise network from a convergence gateway corresponding to the enterprise network, and may send an attach request for the enterprise network to the convergence gateway. After receiving the attach request, the convergence gateway obtains the proxy server address and sends the proxy server address to the user equipment such that the user equipment performs a SIP registration procedure based on the address, thereby communicating with another user equipment using the convergence gateway. The second user equipment may be user equipment in the first network or may be user equipment in the second network. In this way, communication between internal users of the enterprise network and communication between an internal user and an external user of the enterprise network can be implemented. Further, the user equipment may send, to the convergence gateway, an application for requesting to access the enterprise network, that is, the foregoing attach request. The enterprise applies to an operator network to add the user equipment to the enterprise network. The operator network may send a P-CSCF address to the user equipment using the convergence gateway. Alternatively, the operator opens a signaling interface, for example, opens an S6a interface in LTE to the convergence gateway, for obtaining the P-CSCF address. Alternatively, the operator may copy subscription information of an enterprise employee for the convergence gateway such that only particular user equipment in the enterprise network obtains the P-CSCF address. The S6a interface is an interface between an MME and an HSS in an EPC, supports signaling transmission, and provides functions related to user subscription data management and authentication. Further, a manner for obtaining the P-CSCF address may be set to be associated with a permission of the user equipment in the enterprise network. For example, if the user equipment is an enterprise employee in the enterprise network, the P-CSCF address stored in the convergence gateway is directly returned to the user equipment, or if the user equipment is a common user in the enterprise network, the convergence gateway may request the P-CSCF address from the operator network such that an operator side determines whether to deliver the P-CSCF address.

Step 103. The convergence gateway determines, based on the first user permission information, a forwarding manner for forwarding the service information to second user equipment.

Optionally, the forwarding manner includes any one of the following manners directly forwarding the service information to the second user equipment using the convergence gateway, or forwarding the service information to the second network using the convergence gateway, and forwarding the service information to the second user equipment using the second network.

The convergence gateway may further determine the forwarding manner for the service information with reference to user permission information (that is, second user permission information), in the first network, of user equipment to which the service information needs to be sent, that is, the second user equipment. Determining, based on the user permission information, the forwarding manner for forwarding the service information to the second user equipment may be as follows. The convergence gateway obtains the second user permission information of the second user equipment in the first network, the convergence gateway sends the service information to the second user equipment if the first user permission information indicates that the first user equipment is an authorized user in the first network and the second user permission information indicates that the second user equipment is also an authorized user in the first network, and if the second user permission information indicates that the second user equipment is a user in the second network, the convergence gateway forwards the service information to the second network, and sends the service information to the second user equipment using the second network. The authorized user may be a specific user that has a specific permission in the private network, such as the enterprise employee in the enterprise network.

Further, for the user equipment in the coverage area of the private network such as the enterprise network, the convergence gateway may determine a service information forwarding path according to obtained user permission information of the user equipment in the enterprise network. For example, when the first user equipment and the second user equipment are both enterprise employees in the enterprise network, service information may be directly forwarded using the convergence gateway, that is, the convergence gateway may directly send the received service information of the first user equipment to the second user equipment, or send received service information of the second user equipment to the first user equipment. When the first user equipment is an authorized user or a common user in the enterprise network and the second user equipment is a user in an operator wireless network, the service information may be forwarded in a manner of the convergence gateway plus the operator wireless network, that is, the convergence gateway may forward the service information of the first user equipment to the operator wireless network, and the operator wireless network sends the service information to the second user equipment, or the convergence gateway may receive the service information that is of the second user equipment and that is forwarded by the operator wireless network, and the convergence gateway sends the service information to the first user equipment. When the first user equipment and the second user equipment are both users in the enterprise network and at least one of the first user equipment and the second user equipment is a common user, the forwarding manner may be determined according to a charging policy negotiated in advance by the enterprise network and the operator wireless network, for example, the service information is forwarded in a manner of the convergence gateway plus the operator wireless network.

Figure 5:
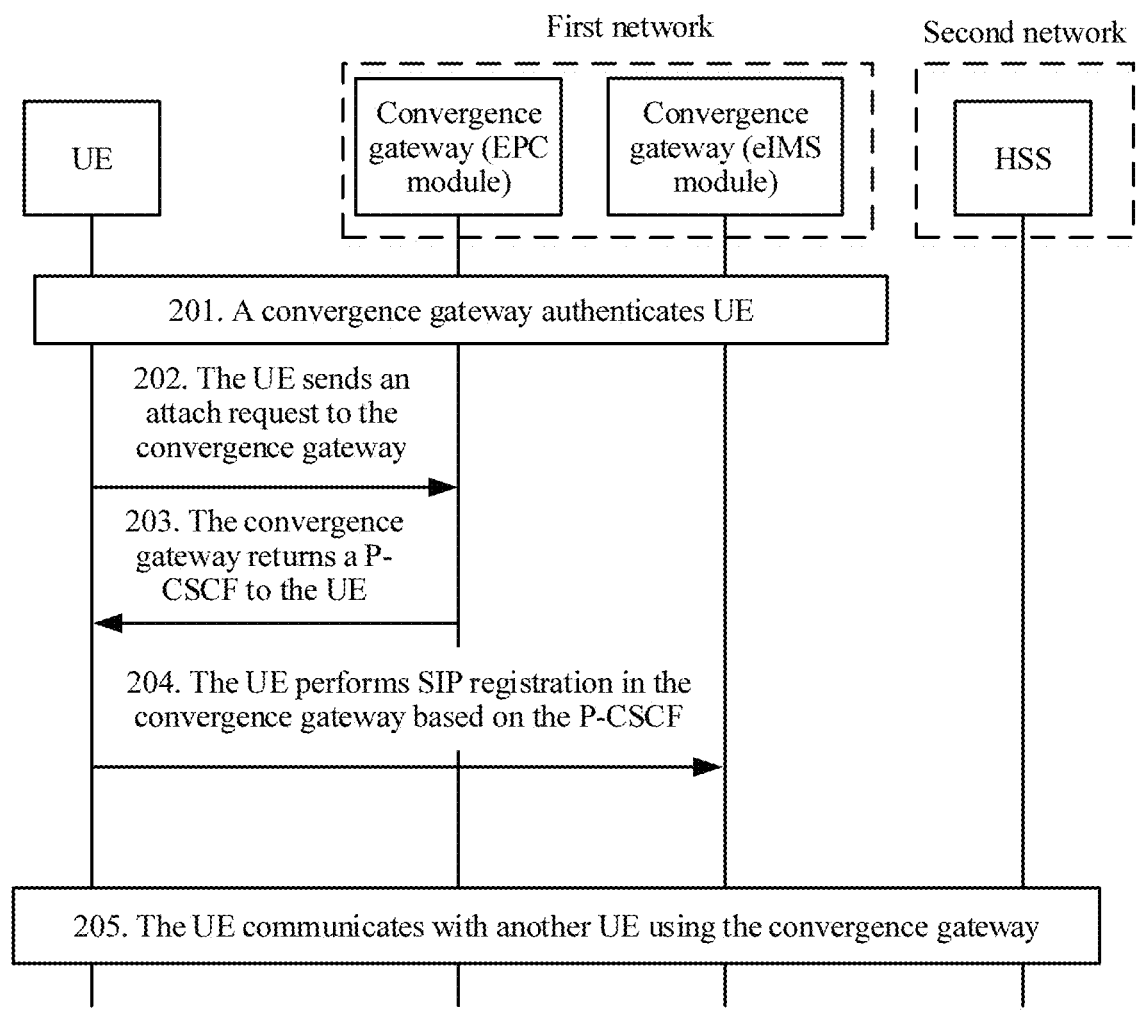
FIG. 5 is a schematic interaction diagram of a Session Initiation Protocol (SIP) registration procedure according to an embodiment of the present disclosure.

Further, referring to FIG. 5, FIG. 5 is a schematic interaction diagram of a SIP registration procedure according to an embodiment of the present disclosure. As shown in FIG. 5, the SIP registration procedure in this embodiment of the present disclosure may include the following steps.

Step 201. A convergence gateway authenticates UE.

Further, when the UE is in an enterprise wireless network, that is, a private network, the UE may send an attach request message to the convergence gateway, and the convergence gateway authenticates the UE. Further, the UE may send the attach request to an EPC module, and the EPC module requests authentication encryption data from an IMS module in order to implement authentication encryption interaction between the convergence gateway (which is further the EPC module) and the UE based on the authentication encryption data.

Step 202. The UE sends an attach request to the convergence gateway.

Step 203. The convergence gateway returns a P-CSCF address to the UE.

After authenticating the UE, the convergence gateway (the EPC module) may send an Evolved Packet System (EPS) session management (ESM) information request to the UE. The UE returns an ESM information response message, that is, the foregoing attach request, and the message may carry a PCO in order to request the P-CSCF address corresponding to the convergence gateway using a Protocol configuration options (PCO) information element. After receiving the request, the convergence gateway (the EPC module) may obtain the P-CSCF address and send an attach accept message to the UE, where the attach accept message may carry the PCO information element, and the PCO information element may carry P-CSCF IP information, UE IP information and the like requested by the UE.

Step 204. The UE performs SIP registration in the convergence gateway based on the P-CSCF.

After obtaining the P-CSCF address corresponding to the enterprise network, the UE may initiate a Sip Register, that is, SIP registration, to the convergence gateway (the IMS module). The convergence gateway (the IMS module) synchronizes authentication data and user data of the UE to perform location update. After location update succeeds, the convergence gateway (the IMS module) may return a registration success message, such as 200 OK, to a user, to indicate that registration succeeds.

Step 205. The UE communicates with another UE using the convergence gateway.

Further, after performing SIP registration, the UE (that is, first user equipment) may perform voice communication with the other UE (second user equipment) such as UE in a second network based on the convergence gateway. An example in which the UE (the UE is referred to as "calling UE" below) in the enterprise network initiates a call is used for description below.

The calling UE sends a call request to the convergence gateway, such as an invite message. The invite message includes information such as an identifier of called UE (referred to as "called UE" below) at a peer end. After the convergence gateway receives the call request, if the called UE is a fixed-line phone, the convergence gateway may allocate carrier information in the enterprise network to the calling UE, and forward the call request to a public network, that is, a second network, in which the called UE is located, and further, may forward the call request to a PSTN in the second network. After receiving the call request, the PSTN returns carrier information of the called UE to the convergence gateway. After receiving the carrier information of the called UE, the convergence gateway may forward the carrier information of the calling UE and the carrier information of the called UE to the calling UE such that a session is established between the calling UE and the called UE to perform voice communication. When the calling UE sends a call end request (Bye) message, after receiving the bye message of the calling UE, the convergence gateway may end the session between the calling UE and the called UE.

Further, after performing SIP registration, the UE may further perform data communication with the other UE based on the convergence gateway. For example, when the enterprise network identifies that both UEs that receive and send data are enterprise employees in the enterprise network, data may be directly forwarded to an egress of an enterprise internal network or the Internet using the convergence gateway without a need of transit using an operator network such that an access speed is increased, and an extra fee is avoided.

Optionally, after the convergence gateway sends the proxy server address to the first user equipment, the convergence gateway may further send a network identifier of the first network to the first user equipment such that the first user equipment displays the network identifier. The network identifier is used to identify convergence deployment for the first network and the second network, and may include a service provider name, an enterprise name, or the like. For example, the network identifier may be China Unicom (Tsinghua University) or China Mobile (Shenzhen Metro). Further, the network identifier may be preconfigured. For example, the network identifier may be customized by an administrator of the enterprise network, or may be applied by a user of the enterprise network to the operator and configured by the operator according to an enterprise requirement. This is not limited in this embodiment of the present disclosure.

Further, the UE receives and stores the network identifier that is of the first network and that is sent by the convergence gateway, and may determine whether a public land mobile network (PLMN) of the first network matches a PLMN or service provider display information (SPDI) in an international mobile subscriber identity (IMSI) corresponding to the first user equipment. If no, a network identifier corresponding to the current PLMN is displayed.

Further, when the first user equipment is powered on, or when a service provider name (SPN) read in a user identity module of the first user equipment is empty, the first user equipment may display only a network identifier of the PLMN of the first network. If the PLMN of the first network matches a PLMN or SPDI in an IMSI in the user identity module, the SPN may be displayed on the first user equipment, and whether to display the network identifier (that is, the network identifier of the first network) of the PLMN of the first network may be determined according to a rule specified in a preset configuration file such as an elementary file ($EF_{SPN}$). Further, a least significant bit of a first byte (Display Condition field) of the $EF_{SPN}$ may be determined. If the least significant bit is 1, the network identifier of the PLMN is displayed, or if the least significant bit is 0, the network identifier of the PLMN is not displayed. If the current PLMN does not match the PLMN or the SPDI in the IMSI in the user identity module, it indicates that the first user equipment is in a roaming state, the network identifier of the PLMN may be displayed, and a second least significant bit of the first byte (Display Condition field) of the $EF_{SPN}$ may be determined. If the second least significant bit is 0, the SPN is displayed, or if the second least significant bit is 1, the SPN is not displayed.

The user identity module may be a mobile phone card, such as a subscriber identity module (SIM), which is also referred to as a subscriber identification module or a smart card, or may be a universal SIM (USIM) card, or may be a universal integrated circuit card (UICC), or may be a user identity module (UIM), or the like. This is not limited in this embodiment of the present disclosure.

The network identifier of the PLMN of the first network may be carried in an OTA message delivered by the convergence gateway. Further, the network identifier of the PLMN may be based on a NITZ mechanism, delivered using the convergence gateway, and carried in the OTA message using MM INFORMATION. The MM INFORMATION in the OTA message includes information such as a service provider name or time in terms of a time zone, and the convergence gateway may send the message to the first user equipment in an RRC connection establishment process. In this way, customization of a network identifier of the private network such as the enterprise network can be implemented. For example, the network identifier may be customized as China Unicom (Tsinghua University) or China Mobile (Shenzhen Metro) to distinguish between a public range and a specific range of an operator service and indicate that a user is in a specific area in order to perform permission management for different user types.

In the technical solution provided in this application, the convergence gateway may notify the UE of the P-CSCF address of the private network when the UE needs to access the private network such that the UE performs SIP registration based on the P-CSCF address. In this way, when a service request sent by the user equipment is received, user permission information of the user equipment in the first network is obtained, and it is determined, based on the user permission information, that service information corresponding to the service request is directly forwarded to the other user equipment using the convergence gateway, or service information is forwarded to the second network using the convergence gateway and the service information is forwarded to the second user equipment using the second network. In this way, voice communication and data communication between the user equipment in the enterprise private network and the other user equipment are implemented without a need of transit using the operator network. A convergence service for the private network and the public network can be provided, communication efficiency can be improved, indoor communication signal quality can be improved, and communication costs can be reduced. According to a convergence solution for the private network and the public network in this application, a public permission can be reserved when voice, data, and a number are kept unchanged such that an identifier of the private network can be customized, and a plurality of value-added services (such as three-way calling, call hold, and call transfer) and service interfaces can be provided in order to perform permission management for different access user types. The convergence solution supports frequency bands of a plurality of operators, and total construction costs are reduced. Indoor deployment initiative is improved, and quality of a communication signal in indoor coverage is improved.

Figure 6:
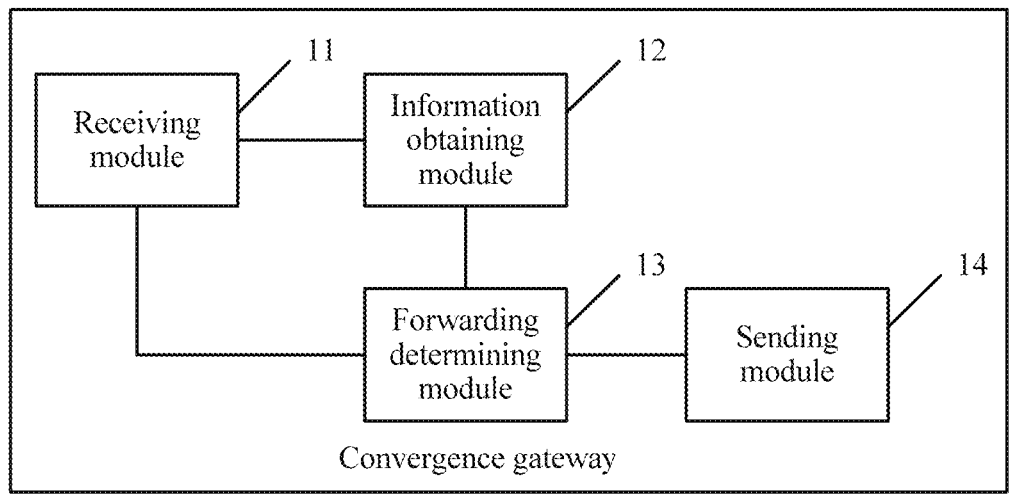
FIG. 6 is a schematic structural diagram of a convergence gateway according to an embodiment of the present disclosure.

Referring to FIG. 6, FIG. 6 is a schematic structural diagram of a convergence gateway according to an embodiment of the present disclosure. Further, the convergence gateway is deployed in a first network, and the first network is connected to a second network using the convergence gateway. As shown in FIG. 6, the convergence gateway in this embodiment of the present disclosure may include a receiving module 11, an information obtaining module 12, and a forwarding determining module 13.

The receiving module 11 is configured to receive a service request sent by first user equipment, where the service request includes identity information of the first user equipment and service information of the first user equipment.

The first user equipment may be user equipment in a coverage area of the first network, that is, a private network. Further, the service request may be a call request, a data request, or the like. Correspondingly, the service information may include voice information, data information, or the like.

The information obtaining module 12 is configured to obtain first user permission information of the first user equipment in the first network according to the identity information of the first user equipment.

Further, the information obtaining module 12 may determine a permission of the first user equipment according to the identity information that is of the first user equipment and that is received by the receiving module 11, for example, determines that the first user equipment is an enterprise employee in the private network such as an enterprise network, or a common user (visitor) in the enterprise network.

The forwarding determining module 13 is configured to determine, based on the first user permission information obtained by the information obtaining module 12, a forwarding manner for forwarding the service information to second user equipment.

The forwarding manner includes any one of the following manners directly forwarding the service information to the second user equipment using the convergence gateway, or forwarding the service information to the second network using the convergence gateway, and forwarding the service information to the second user equipment using the second network.

Further, the receiving module 11 is further configured to receive an attach request that is sent by the first user equipment and that is used to request to access the first network.

The information obtaining module 12 is further configured to obtain, in response to the attach request, a proxy server address configured for the convergence gateway.

The convergence gateway may further include a sending module 14 configured to send the proxy server address to the first user equipment such that the first user equipment accesses the first network based on the proxy server address and communicates with the second user equipment using the convergence gateway.

Optionally, a specific manner in which the information obtaining module 12 obtains the proxy server address configured for the convergence gateway may be forwarding the attach request to the second network, and receiving the proxy server address returned by the second network for the attach request, obtaining, using a preset signaling interface, the proxy server address configured for the convergence gateway, or obtaining, from subscription information of the first user equipment, the proxy server address configured for the convergence gateway.

The proxy server address may be a P-CSCF address.

The forwarding determining module 13 may be further configured to obtain second user permission information of the second user equipment in the first network, send the service information to the second user equipment if the first user permission information indicates that the first user equipment is an authorized user in the first network and the second user permission information indicates that the second user equipment is also an authorized user in the first network, and forward the service information to the second network, and send the service information to the second user equipment using the second network if the second user permission information indicates that the second user equipment is a user in the second network.

Further, that the private network is an enterprise network is used as an example. When the first user equipment and the second user equipment are both enterprise employees in the enterprise network, service information may be directly forwarded using the convergence gateway, that is, the forwarding determining module 13 may directly send the received service information of the first user equipment to the second user equipment, or send received service information of the second user equipment to the first user equipment. When the first user equipment is an authorized user or a common user in the enterprise network and the second user equipment is a user in an operator wireless network, the service information may be forwarded in a manner of the convergence gateway plus the operator wireless network, that is, the forwarding determining module 13 may forward the service information of the first user equipment to the operator wireless network, and the operator wireless network sends the service information to the second user equipment, or the forwarding determining module 13 may receive the service information that is of the second user equipment and that is forwarded by the operator wireless network, and the convergence gateway sends the service information to the first user equipment. When the first user equipment and the second user equipment are both users in the enterprise network and at least one of the first user equipment and the second user equipment is a common user, the forwarding determining module 13 may determine the forwarding manner according to a charging policy negotiated in advance by the enterprise network and the operator wireless network, for example, the service information is forwarded in a manner of the convergence gateway plus the operator wireless network.

Further, the sending module 14 may be further configured to send a network identifier of the first network to the first user equipment such that the first user equipment displays the network identifier, where the network identifier is used to identify convergence deployment for the first network and the second network.

The network identifier of the first network may be carried in an OTA message delivered by the convergence gateway, and the OTA message may be further delivered based on a NITZ mechanism.

In the technical solution provided in this application, the convergence gateway may obtain the user permission information of the user equipment in the first network when receiving the service request sent by the user equipment in order to determine, based on the user permission information, to directly forward the service information corresponding to the service request to another user equipment using the convergence gateway, or forward the service information to the second network using the convergence gateway, and forward the service information to the second user equipment using the second network such that the user equipment implements, based on the convergence gateway, communication between the user equipment in the private network and the other user equipment. In this way, a convergence service for the private network and a public network can be provided, communication efficiency can be improved, indoor communication signal quality can be improved, and network construction costs can be reduced.

Figure 7:
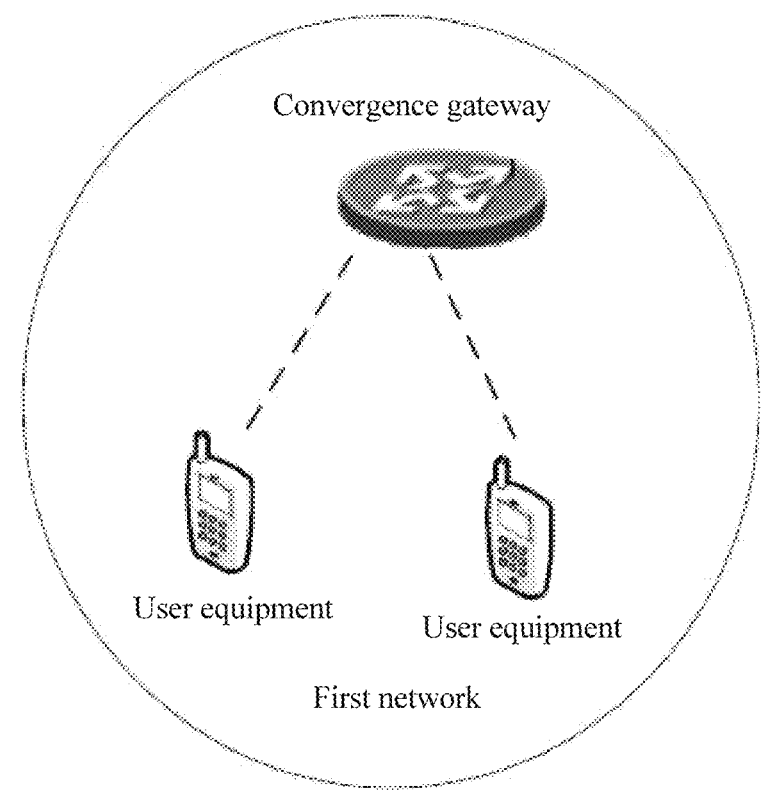
FIG. 7 is a schematic structural diagram of an information transmission system according to an embodiment of the present disclosure.

Referring to FIG. 7, FIG. 7 is a schematic structural diagram of an information transmission system according to an embodiment of the present disclosure. Further, as shown in FIG. 7, the system in this embodiment of the present disclosure may include a first network and a convergence gateway.

The convergence gateway is configured to receive a service request sent by first user equipment in the first network, where the service request includes identity information of the first user equipment and service information of the first user equipment, obtain first user permission information of the first user equipment in the first network according to the identity information of the first user equipment, and determine, based on the first user permission information, a forwarding manner for forwarding the service request to second user equipment.

The forwarding manner includes any one of the following manners directly forwarding the service information to the second user equipment using the convergence gateway, or forwarding the service information to a second network using the convergence gateway, and forwarding the service information to the second user equipment using the second network, where the first network is connected to the second network using the convergence gateway.

Further, the first network may further include a first switch, a second switch, and a small cell (not shown in FIG. 7). The first switch is configured to receive a message sent by user equipment (which is not user equipment in the small cell) in the first network, such as the sent service request. The second switch is configured to receive a service request sent by the small cell, and the service request may be further a service request sent by user equipment in the small cell. The first switch and the second switch forward the service requests to the convergence gateway. For example, the first switch may be the enterprise campus switch shown in FIG. 1, and the second switch may be the PoE switch shown in FIG. 1. A device such as an HSS, an MME, a PCRF, or a GW may be deployed in the second network. For details, refer to a device deployed in an existing operator network, and details are not described herein.

Further, for the convergence gateway, the first network, the second network, the first user equipment, the second user equipment, and the like herein, refer to related descriptions in the foregoing embodiments, and details are not described herein again.

For the purpose of convenient and brief description, division of the foregoing function modules is merely used as an example for illustration. In actual application, the foregoing functions may be allocated to different function modules and implemented according to a requirement, that is, an inner structure of an apparatus is divided into different function modules to implement all or a part of the functions described above. For a detailed working process of the apparatus described above, refer to a corresponding process in the foregoing method embodiments shown in FIG. 4 and FIG. 5, and details are not described herein again.

Figure 8:
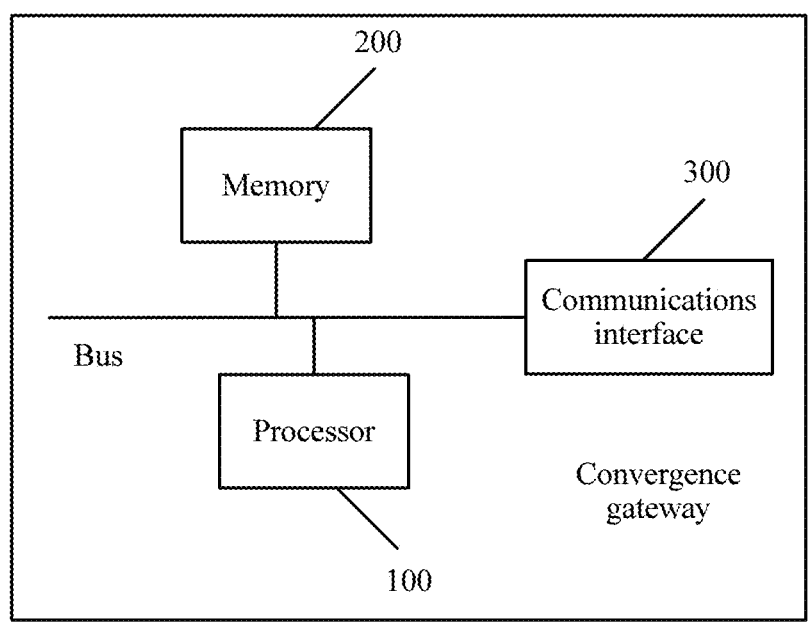
FIG. 8 is a schematic structural diagram of another convergence gateway according to an embodiment of the present disclosure.

Referring to FIG. 8, FIG. 8 is a schematic structural diagram of another convergence gateway according to an embodiment of the present disclosure. Further, as shown in FIG. 8, the convergence gateway in this embodiment of the present disclosure includes a communications interface 300, a memory 200, and a processor 100, and the processor 100 is connected to the communications interface 300 and the memory 200 respectively.

A data connection between the communications interface 300, the memory 200, and the processor 100 may be implemented using a bus, or may be implemented in another manner. A connection implemented using the bus is described in this embodiment. Further, the convergence gateway is applied to the foregoing first network, the convergence gateway is deployed in the first network, and the first network is connected to a second network using the convergence gateway. The convergence gateway in this embodiment of the present disclosure may correspond to the convergence gateway in the embodiments corresponding to FIG. 1 to FIG. 7. For details, refer to related descriptions in the embodiments corresponding to FIG. 1 to FIG. 7.

The processor 100 may be a central processing unit (CPU), a network processor (NP), or a combination of a CPU and an NP.

The processor 100 may further include a hardware chip. The hardware chip may be an application-specific integrated circuit (ASIC), a programmable logic device (PLD), or a combination thereof. The PLD may be a complex PLD (CPLD), a field programmable gate array (FPGA), generic array logic (GAL), or any combination thereof.

The memory 200 may include a volatile memory, such as a random-access memory (RAM). The memory may also include a non-volatile memory, such as a flash memory, a hard disk drive (HDD), or a solid-state drive (SSD). The memory 200 may further include a combination of the foregoing types of memories.

The memory 200 is configured to store user permission information.

Optionally, the memory 200 may be further configured to store a program instruction. The processor 100 invokes the program instruction stored in the memory 200, and may perform one or more steps or optional implementations in the embodiments shown in FIG. 4 and FIG. 5 such that the convergence gateway implements a function of the convergence gateway in the foregoing method.

The processor 100 is configured to receive, using the communications interface 300, a service request sent by first user equipment, where the service request includes identity information of the first user equipment and service information of the first user equipment, obtain first user permission information of the first user equipment in the first network according to the identity information of the first user equipment, and determine, based on the first user permission information, a forwarding manner for forwarding the service information to second user equipment.

The forwarding manner includes any one of the following manners directly forwarding the service information to the second user equipment using the convergence gateway, or forwarding the service information to the second network using the convergence gateway, and forwarding the service information to the second user equipment using the second network.

Optionally, the processor 100 is further configured to receive, using the communications interface 300, an attach request that is sent by the first user equipment and that is used to request to access the first network, obtain, in response to the attach request, a proxy server address configured for the convergence gateway, and send the proxy server address to the first user equipment using the communications interface 300 such that the first user equipment accesses the first network based on the proxy server address and communicates with the second user equipment using the convergence gateway.

Optionally, the processor 100 is further configured to forward the attach request to the second network using the communications interface 300, and receive the proxy server address returned by the second network for the attach request, or obtain, using a preset signaling interface, the proxy server address configured for the convergence gateway, or obtain, from subscription information of the first user equipment, the proxy server address configured for the convergence gateway.

Optionally, the proxy server address is a P-CSCF address.

Optionally, the processor 100 is further configured to obtain second user permission information of the second user equipment in the first network, send the service information to the second user equipment using the communications interface 300 if the first user permission information indicates that the first user equipment is an authorized user in the first network and the second user permission information indicates that the second user equipment is also an authorized user in the first network, and forward the service information to the second network using the communications interface 300, and send the service information to the second user equipment using the second network if the second user permission information indicates that the second user equipment is a user in the second network.

Optionally, the processor 100 is further configured to send a network identifier of the first network to the first user equipment using the communications interface 300 such that the first user equipment displays the network identifier.

The network identifier may be used to identify convergence deployment for the first network and the second network.

For function implementation and details of the convergence gateway, refer to descriptions in the method embodiments shown in FIG. 4 and FIG. 5, and details are not described herein again.

In the several embodiments provided in the present disclosure, it should be understood that the disclosed apparatus and method may be implemented in other manners. For example, the described apparatus embodiment is merely an example. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network modules. Some or all the modules may be selected according to actual needs to achieve the objectives of the solutions of the embodiments.

In addition, functional modules in the embodiments of the present disclosure may be integrated into one processing module, or each of the modules may exist alone physically, or two or more modules are integrated into one module. The integrated module may be implemented in a form of hardware, or may be implemented in a form of hardware in addition to a software functional module.

When the foregoing integrated module is implemented in a form of a software functional module, the integrated module may be stored in a computer-readable storage medium. The software functional module is stored in a storage medium and includes several instructions for instructing a computer device (which may be a personal computer, a server, or a network device) or a processor to perform a part of the steps of the methods described in the embodiments of the present disclosure. The foregoing storage medium includes any medium that can store program code, such as a universal serial bus (USB) flash drive, a removable hard disk, a read-only memory (ROM), a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present disclosure.

The invention claimed is:

1. An information transmission method implemented by a convergence gateway of a first network, wherein the information transmission method comprises:
    receiving a service request from a first user equipment, wherein the first network is coupled to a second network through the convergence gateway, and wherein the service request comprises identity information of the first user equipment and service information of the first user equipment;
    obtaining first user permission information of the first user equipment that is in the first network according to the identity information;
    determining, based on the first user permission information, a forwarding manner for forwarding the service information to a second user equipment; and
    sending, based on the forwarding manner, the service information to the second user equipment.

2. The information transmission method of claim 1, further comprising obtaining second user permission information of the second user equipment that indicates the second user equipment is in the first network or in the second network,
    wherein the sending the service information to the second user equipment comprises sending the service information to the second user equipment when the first user permission information indicates that the first user equipment that is in the first network is a first authorized user and the second user permission information indicates that the second user equipment that is in the first network is a second authorized user, or
    sending the service information to the second network and sending the service information to the second user equipment using the second network when the second user permission information indicates that the second user equipment that is in the second network is a user.

3. The information transmission method of claim 1, wherein before receiving the service request from the first user equipment, the information transmission method further comprises:
    receiving, from the first user equipment, an attach request requesting to access the first network;
    obtaining, in response to the attach request, a proxy server address configured for the convergence gateway; and
    sending the proxy server address to the first user equipment to enable the first user equipment to access the first network based on the proxy server address and to communicate with the second user equipment using the convergence gateway.

4. The information transmission method of claim 3, wherein the obtaining the proxy server address comprises:
    sending the attach request to the second network; and
    receiving the proxy server address from the second network for the attach request.

5. The information transmission method of claim 3, wherein after sending the proxy server address to the first user equipment, the information transmission method further comprises sending a network identifier of the first network to the first user equipment to enable the first user equipment to display the network identifier that identifies a convergence deployment for the first network and the second network.

6. The information transmission method of claim 3, wherein the obtaining the proxy server address comprises obtaining, using a preset signaling interface, the proxy server address.

7. The information transmission method of claim 3, wherein the obtaining the proxy server address comprises obtaining, from subscription information of the first user equipment, the proxy server address.

8. A convergence gateway deployed in a first network coupled to a second network through the convergence gateway, wherein the convergence gateway comprises:
    a memory storing instructions; and
    a processor coupled to the memory, wherein the instructions are executed by the processor to cause the convergence gateway to be configured to:
        receive a service request from a first user equipment, wherein the service request comprises identity information of the first user equipment and service information of the first user equipment;

obtain first user permission information of the first user equipment that is in the first network according to the identity information;

determine, based on the first user permission information, a forwarding manner for forwarding the service information to a second user equipment; and send, based on the forwarding manner, the service information to the second user equipment.

9. The convergence gateway of claim 8, wherein the instructions further cause the convergence gateway to be configured to:

obtain second user permission information of the second user equipment that indicates the second user equipment is in the first network or in the second network; and wherein the instructions further cause the convergence gateway to be configured to send the service information to the second user equipment when the first user permission information indicates that the first user equipment that is in the first network is a first authorized user and the second user permission information indicates that the second user equipment that is in the first network is a second authorized user, or wherein the instructions further cause the convergence gateway to be configured to send the service information to the second network, and send the service information to the second user equipment using the second network when the second user permission information indicates that the second user equipment that is in the second network is a user.

10. The convergence gateway of claim 8, wherein the instructions further cause the convergence gateway to be configured to:

receive an attach request from the first user equipment requesting to access the first network;

obtain, in response to the attach request, a proxy server address configured for the convergence gateway; and send the proxy server address to the first user equipment to enable the first user equipment to access the first network based on the proxy server address and to communicate with the second user equipment using the convergence gateway.

11. The convergence gateway of claim 10, wherein the instructions further cause the convergence gateway to be configured to:

send the attach request to the second network; and receive the proxy server address from the second network for the attach request.

12. The convergence gateway of claim 10, wherein the instructions further cause the convergence gateway to be configured to send a network identifier of the first network to the first user equipment after sending the proxy server address to the first user equipment, and wherein the network identifier identifies convergence deployment for the first network and the second network.

13. The convergence gateway of claim 10, wherein the instructions further cause the convergence gateway to be configured to:

obtain the proxy server address; or obtain, from subscription information of the first user equipment, the proxy server address.

14. An information transmission system comprising:

a first user equipment; and a convergence gateway deployed in a first network coupled to a second network through the convergence gateway, wherein the convergence gateway is configured to:

receive a service request from the first user equipment, wherein the service request comprises identity information of the first user equipment and service information of the first user equipment;

obtain first user permission information of the first user equipment that is in the first network according to the identity information of the first user equipment;

determine, based on the first user permission information, a forwarding manner for forwarding the service information to a second user equipment; and send, based on the forwarding manner, the service information to the second user equipment.

15. The information transmission system of claim 14, wherein the convergence gateway is further configured to:

obtain second user permission information of the second user equipment that indicates the second user equipment is in the first network or in the second network; and wherein the convergence gateway is further configured to send the service information to the second user equipment when the first user permission information indicates that the first user equipment that is in the first network is a first authorized user and the second user permission information indicates that the second user equipment that is in the first network is a second authorized user, or wherein the convergence gateway is further configured to send the service information to the second network, and send the service information to the second user equipment using the second network when the second user permission information indicates that the second user equipment that is in the second network is a user.

16. The information transmission system of claim 14, wherein the convergence gateway is further configured to:

receive an attach request from the first user equipment requesting to access the first network;

obtain, in response to the attach request, a proxy server address configured for the convergence gateway; and send the proxy server address to the first user equipment to enable the first user equipment to access the first network based on the proxy server address and to communicate with the second user equipment using the convergence gateway.

17. The information transmission system of claim 16, wherein the convergence gateway is further configured to:

send the attach request to the second network; and receive the proxy server address from the second network for the attach request.

18. The information transmission system of claim 16, wherein the convergence gateway is further configured to send a network identifier of the first network to the first user equipment after sending the proxy server address to the first user equipment, and wherein the network identifier identifies convergence deployment for the first network and the second network.

19. The information transmission system of claim 16, wherein the convergence gateway is further configured to:

obtain the proxy server address; or obtain, from subscription information of the first user equipment, the proxy server address.

20. The information transmission method of claim 3, further comprising:

obtaining the proxy server address; or obtaining, from subscription information of the first user equipment, the proxy server address.

* * * * *